(12) United States Patent
Del Pinto

(10) Patent No.: US 10,538,050 B2
(45) Date of Patent: Jan. 21, 2020

(54) AIRCRAFT PANEL ASSEMBLY WITH REINFORCEMENT LAYERS

(71) Applicant: C&D ZODIAC, INC., Huntington Beach, CA (US)

(72) Inventor: James Edward Del Pinto, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 301 days.

(21) Appl. No.: 15/291,587

(22) Filed: Oct. 12, 2016

(65) Prior Publication Data

US 2017/0100910 A1 Apr. 13, 2017

Related U.S. Application Data

(60) Provisional application No. 62/240,370, filed on Oct. 12, 2015.

(51) Int. Cl.
*B32B 3/26* (2006.01)
*B29C 51/08* (2006.01)
(Continued)

(52) U.S. Cl.
CPC ............ *B32B 3/266* (2013.01); *B29C 51/082* (2013.01); *B29C 51/421* (2013.01); *B29C 70/46* (2013.01);
(Continued)

(58) Field of Classification Search
CPC .............. B29D 99/0021; B29D 99/001; B29D 99/002; B29K 2101/12; B29K 2105/089; B29K 2307/04; B29K 2309/08; B32B 2262/101; B32B 2262/106; B32B 2605/18; B32B 27/08; B32B 5/024; B32B 2260/023; B32B 2260/046; B32B 2260/021; B32B 2262/0269; B32B 2262/10;
(Continued)

(56) References Cited

U.S. PATENT DOCUMENTS 5,984,511 A 11/1999 Vasey-Glandon et al.
9,358,703 B2 6/2016 Matsen et al.
(Continued)

FOREIGN PATENT DOCUMENTS

WO 2014108640 7/2014

OTHER PUBLICATIONS

EP16193483 European Search Report dated Mar. 28, 2017.

*Primary Examiner* — Camie S Thompson
(74) *Attorney, Agent, or Firm* — Jeffer Mangels Butler & Mitchell LLP; Brennan C. Swain, Esq.

(57) ABSTRACT

A panel assembly that includes at least a first upper base layer made of a thermoplastic material that includes fibers therein, at least a first lower base layer made of a thermoplastic material that includes fibers therein, and at least a first reinforcement layer sandwiched or positioned between the first upper base layer and first lower base layer. The upper and lower surfaces of the first reinforcement layer have a smaller surface area than the upper and lower surfaces of the first upper and first lower base layers. The lower surface of the first upper base layer is welded to the upper surface of the first reinforcement layer, and the lower surface of the first reinforcement layer is welded to the upper surface of the first lower base layer.

10 Claims, 2 Drawing Sheets

(51) Int. Cl.
| | |
|---|---|
| *B29C 51/42* | (2006.01) |
| *B29D 99/00* | (2010.01) |
| *B29C 70/46* | (2006.01) |
| *B32B 5/02* | (2006.01) |
| *B32B 27/08* | (2006.01) |
| *B29K 101/12* | (2006.01) |
| *B29K 105/08* | (2006.01) |
| *B29K 307/04* | (2006.01) |
| *B29K 309/08* | (2006.01) |
| *B29L 31/30* | (2006.01) |

(52) U.S. Cl.
CPC .......... *B29D 99/0021* (2013.01); *B32B 5/024* (2013.01); *B32B 27/08* (2013.01); *B29K 2101/12* (2013.01); *B29K 2105/089* (2013.01); *B29K 2307/04* (2013.01); *B29K 2309/08* (2013.01); *B29L 2031/3082* (2013.01); *B32B 2250/40* (2013.01); *B32B 2262/101* (2013.01); *B32B 2262/106* (2013.01); *B32B 2605/18* (2013.01)

(58) Field of Classification Search
CPC ... B32B 2605/00; B32B 27/12; B32B 27/281; B32B 27/285; B32B 27/36; B32B 27/32; B32B 2250/20; B32B 2250/40; B32B 2250/44; B32B 2255/10; B32B 2270/00; B32B 2398/20; B32B 3/02; B32B 3/04; B32B 3/28; B29C 51/982; B29C 51/421; B29C 70/46; F41H 5/04; F41H 5/0471; F41H 5/0478; F41H 5/0485; Y10T 156/10; Y10T 156/1322; Y10T 428/24132; Y10T 428/24124; Y10T 428/24744; Y10T 428/24777; Y10T 428/249992; Y10T 428/1314
USPC .......... 428/188, 113, 516, 114, 300.7, 411.1, 428/138, 140; 156/60; 296/146.5; 244/119, 129.3
See application file for complete search history.

(56) References Cited

U.S. PATENT DOCUMENTS

| | | | |
|---|---|---|---|
| 2006/0188696 A1* | 8/2006 | Grose | B32B 3/02 428/156 |
| 2008/0131661 A1* | 6/2008 | Albers | B29C 43/18 428/139 |
| 2008/0169380 A1 | 7/2008 | Jackson et al. | |
| 2009/0072086 A1 | 3/2009 | Smith et al. | |
| 2011/0108667 A1 | 5/2011 | Keller et al. | |
| 2014/0127451 A1* | 5/2014 | Pilpel | B32B 5/12 428/113 |
| 2014/0255646 A1 | 9/2014 | Griess et al. | |

* cited by examiner

AIRCRAFT PANEL ASSEMBLY WITH REINFORCEMENT LAYERS

CROSS-REFERENCE TO RELATED APPLICATIONS

This application claims the benefit of U.S. Provisional Application No. 62/240,370, filed Oct. 12, 2015, which is herein incorporated by reference in its entirety.

FIELD OF THE INVENTION

The present invention relates to aircraft panels, and more particularly to aircraft panels with reinforcement layers therein.

BACKGROUND OF THE INVENTION

Conventional panels used in aircraft are typically uniform in cross-sectional strength, and are not optimized for part installations. As a result, to provide structural improvement to panels, the only option is to bond a doubler or wet-lay-up support on the back of the panel. The prior art for thermoformable liner materials focused on light weight scrim added to the bottom of the layers to create a support for material during the forming process. The scrim is often not considered structural and is in many ways a sacrificial layer, as it cannot stretch during the forming process and tears as needed in molding. The present invention allows for discrete stiffeners or reinforcement layers to be imbedded into a sheet during the calendaring paper process. As the fiberglass or carbon reinforcement is not continuous, it allows for the material to properly stretch and form to shape.

In conventional panels, if an attachment point in the panel (e.g., an edge) requires six layers for proper support, the entire panel is made of six layers. Because the center of the panel does not include any attachment points, the center of the panel may be sufficiently strong with only four layers. However, a conventional panel in this situation would still be made with six layers, thereby adding unnecessary weight. The present invention solves this issue.

SUMMARY OF THE PREFERRED EMBODIMENTS

In accordance with a first aspect of the present invention there is provided a panel assembly that includes at least a first upper base layer having an upper surface with an upper surface area and a lower surface with a lower area. The first upper base layer is comprised of a thermoplastic material and includes fibers therein. The panel assembly also includes at least a first lower base layer having an upper surface with an upper surface area and a lower surface with a lower surface area. The upper and lower surface areas of the first upper base layer and the first lower base layer are approximately the same, and the first lower base layer is comprised of a thermoplastic material and includes fibers therein. The panel assembly also includes at least a first reinforcement layer having an upper surface with an upper surface area and a lower surface with a lower surface area. The upper surface area of the first reinforcement layer is smaller than the upper surface areas of the first upper and first lower base layers, and the first reinforcement layer is comprised of a thermoplastic material and includes fibers therein. The lower surface of the first upper base layer is welded to the upper surface of the first reinforcement layer, and the lower surface of the first reinforcement layer is welded to the upper surface of the first lower base layer.

In a preferred embodiment, the upper and lower base layers each include outer edges and the first reinforcement layer provides a border adjacent to or flush with the outer edges of the upper and lower base layers. Preferably the fibers of the upper base layer are comprised of the same material as the fibers of the lower base layer and the fibers of the reinforcement layer are comprised of a different material as the fibers of the upper and lower base layers. In another preferred embodiment, the fibers of the upper base layer are comprised of the same material as the fibers of the lower base layer and the fibers of the reinforcement layer are comprised of the same material as the fibers of the upper and lower base layers. In a preferred embodiment, the fibers of the upper and lower base layers are comprised of fiberglass and the fibers of the reinforcement layer are comprised of carbon. Preferably, the panel assembly includes a second upper base layer and a second lower base layer and/or a second reinforcement layer.

In accordance with another aspect of the present invention there is provided a method of making a panel assembly that includes providing at least a first upper base layer having an upper surface with an upper surface area and a lower surface with a lower area. The first upper base layer is comprised of a thermoplastic material and includes fibers therein. The method also includes providing at least a first lower base layer having an upper surface with an upper surface area and a lower surface with a lower surface area. The upper and lower surface areas of the first upper base layer and the first lower base layer are approximately the same. The first lower base layer is comprised of a thermoplastic material and includes fibers therein. The method also includes providing at least a first reinforcement layer having an upper surface with an upper surface area and a lower surface with a lower surface area. The upper surface area of the first reinforcement layer is smaller than the upper surface areas of the first upper and first lower base layers. The first lower base layer is comprised of a thermoplastic material and includes fibers therein. The method also includes positioning the first reinforcement layer between the first upper base layer and the first lower base layer, heating the first reinforcement layer, first upper base layer and first lower base layer to a temperature above the glass transition temperature of the thermoplastic materials of the first reinforcement layer, first upper base layer and first lower base layer to form a sheet, and molding the sheet to form the panel assembly. The invention also includes a panel assembly or product created by the process and methods described herein.

The present invention provides high strength reinforcement strategically placed within a multilayer thermoformable sheet, comprised of layers of "paper" sheets of thermoplastic resin, such as polyetherimide (PEI), polyphenylsulphone (PPSU), or polyphenylene sulfide (PPS) and chopped strand fiberglass. The panel configuration allows customization, and rigidity as/where needed to support mechanical and structural loads in the aircraft/or as needed for certification.

The layer or layers are incorporated between layers of the paper prior to forming the sheet, the materials are die-cut or trimmed strategically to create a high strength support, and allow the normal forming process to occur, without breaking the reinforcement. The present invention allows the reinforcement layers to be various basis weight glass, beyond a lightweight scrim, and to employ even pre-impregnated or saturated woven materials with thermoplastic resins. It will be appreciated that in constructing the panels, specific locations in the panel that need reinforcement are being targeted and those locations are being reinforced locally.

In a preferred embodiment, the liner thermoformable panel is made of short and/or medium length fibers and a matrix comprised of a thermoplastic resin, such as polyetherimide (PEI), polyphenylsulphone (PPSU), polyphenylene sulfide (PPS), polyoxymethylene/acetal (POM), acrylic (PMMA), fluoropolymers (PTFE, FEP, PVF), ketone-based systems (PEK, PEEK, PEKK), polyimide, polycarbonate (PC), polyethylene (PE), polyphenyleneether (PPE), polyphthalamide (PPA), polypropylene (PP), styrenic systems (ABS, PS, etc.), other sulfone based systems (PES, PSU), urethane and polyurethane (PUR, TPU, etc.), vinyl based systems (PVC, CPVC, etc.) and polyarylamide (PAA) and possibly a binder resin. The molded in doublers are preferably dry glass or glass fabric and a compatible thermoplastic resin. The doublers or reinforcement layers are preferably the same material as the upper and lower base layers of the thermoplastic panel. In another embodiment, the reinforcement layers can be a different material, but are still made of a thermoplastic. As the thermoform sheet is brought to a plastic state (temperatures exceeding 500° F.) it is shuttled in a forming machine and the thermoplastic film or resin with the woven material achieve a plastic state at approximately the same time the paper sheet does, and co-molds/knits with the surrounding material.

See U.S. Patent Publication Nos. 2009/0072086 and 2011/0108667, and U.S. Pat. No. 9,358,703, the entireties of which are incorporated by reference herein, for a discussion of thermoplastic panels.

The invention, together with additional features and advantages thereof, may be best understood by reference to the following description.

BRIEF DESCRIPTION OF THE DRAWINGS

Like numerals refer to like parts throughout the several views of the drawings.

DETAILED DESCRIPTION OF THE PREFERRED EMBODIMENTS

Figure 1:
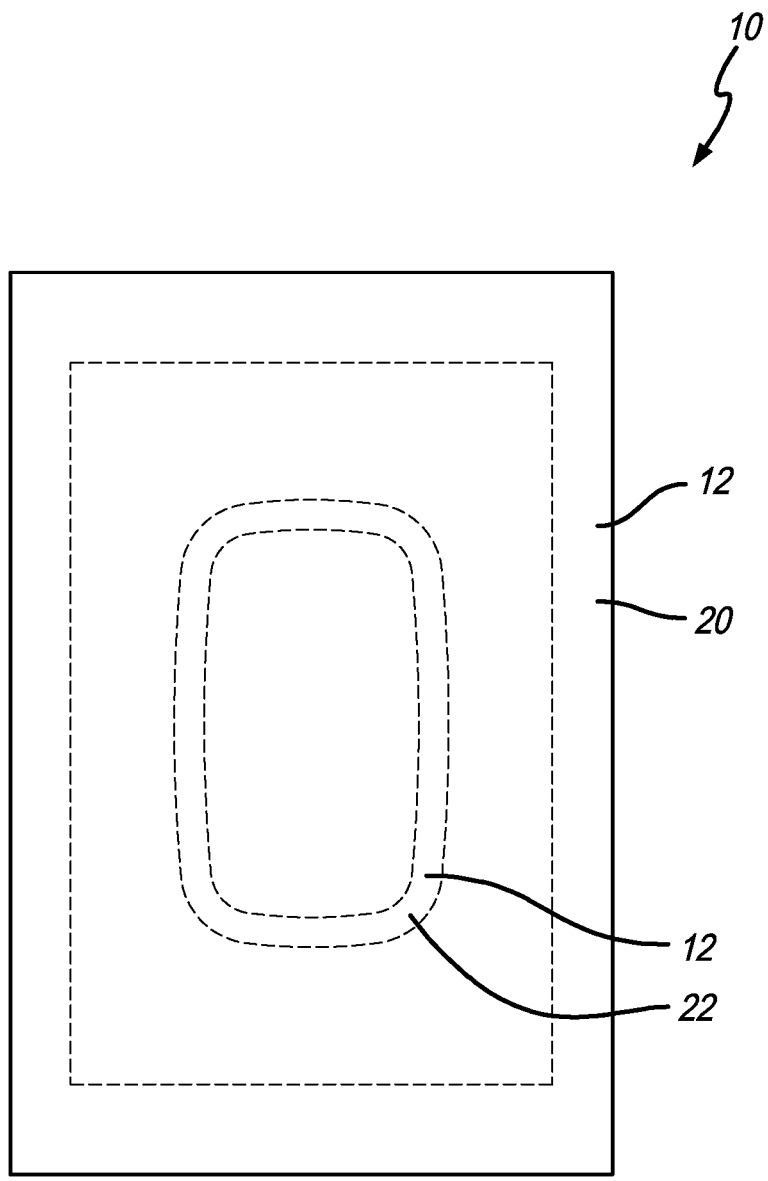
FIG. 1 is an elevational view of a panel that includes reinforcement layers therein in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "upper," "lower," "side," "short," "long," "up," "down," and "below" used herein are merely for ease of description and refer to the orientation of the components as shown in the figures. It should be understood that any orientation of the components described herein is within the scope of the present invention.

Figure 2:
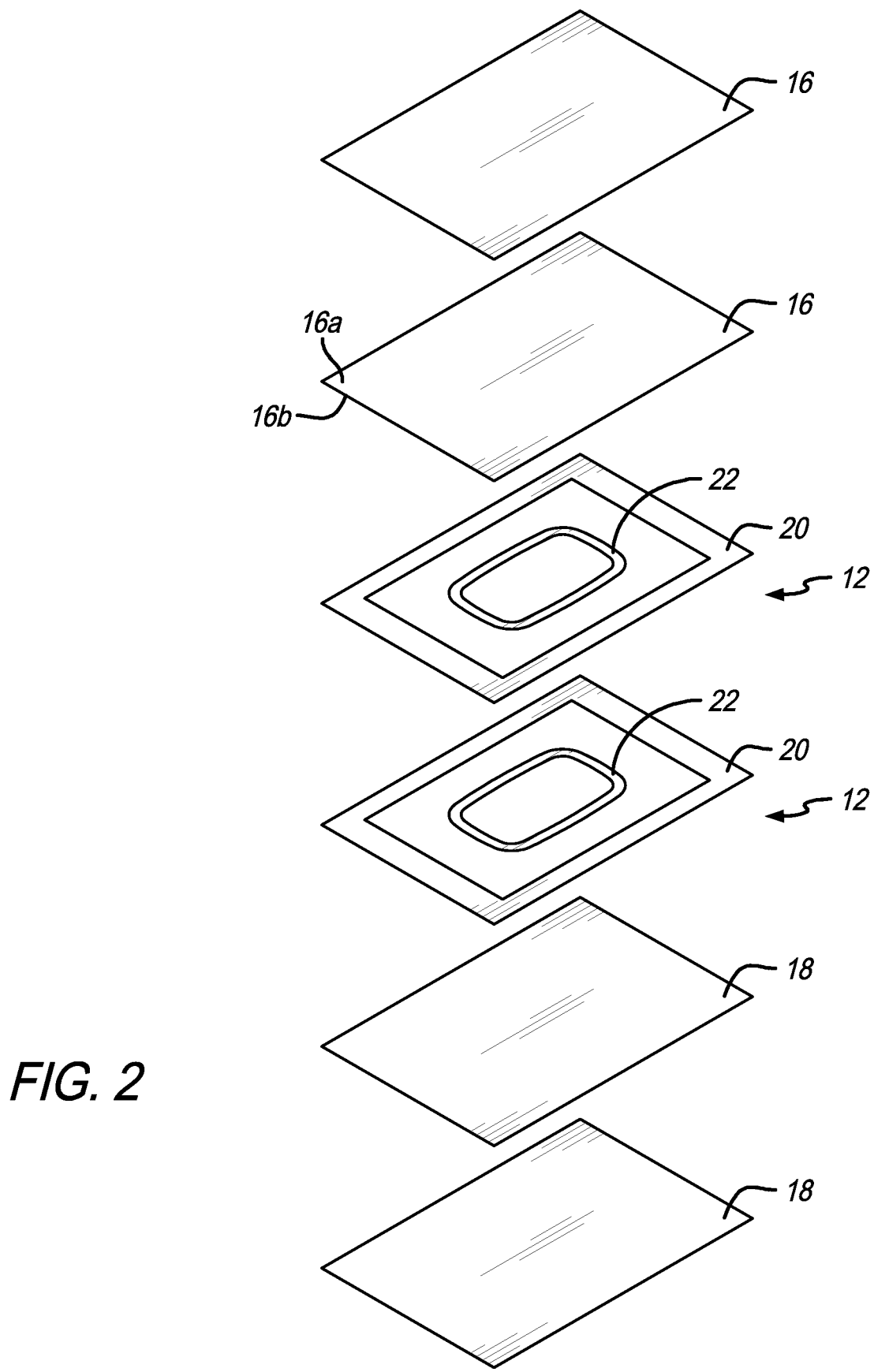
FIG. 2 is an exploded perspective view of the panel of FIG. 1.

Referring now to the drawings, which are for purposes of illustrating the present invention and not for purposes of limiting the same, FIGS. 1-2 show a preferred embodiment of a panel assembly 10 that includes one or more reinforcement layers 12 therein. It will be appreciated that the reinforcement layers are referred to herein generally using the identifier "12," and that specific reinforcement layers are referred to herein using "20" and "22," as discussed below. As described herein, the panel assembly is intended to be used in an aircraft (e.g., side panel, ceiling panel, etc.). However, this is not a limitation on the present invention and the panel assembly can be used elsewhere.

The present invention provides high strength reinforcement strategically placed within a multilayer thermoformable sheet or panel assembly 10, comprised of reinforcement layers 12 of thermoplastic resin (see the exemplary list above) and chopped strand or short linked fiberglass, carbon or the like. The panel assembly allows customization, and rigidity as/where needed to support mechanical and structural loads in the aircraft/or as needed for certification.

FIG. 2 shows an exploded view of the panel assembly 10 including a plurality of upper base layers 16 and lower base layers 18 with the reinforcement layers 12 positioned therebetween. Any number of upper base layers 16, lower base layers 18 and reinforcement layers 12 are within the scope of the present invention. The upper base layers have a first or upper surface 16a and a second or lower surface 16b. The lower base layers have a first or upper surface 18a and a second or lower surface 18b. The reinforcement layers have a first of upper surface 12a and a second or lower surface 12b. In a preferred embodiment, the reinforcement layer or layers 12 are incorporated between upper and lower base layers 16 and 18 prior to forming the sheet or panel assembly 10. The materials are die-cut or trimmed strategically to create a high strength support, and allow the forming process to occur, without breaking the reinforcement. In the present invention, the reinforcement layers 12 can be various basis weight glass, beyond a lightweight scrim, and can employ even pre-impregnated or saturated woven materials with thermoplastic resins.

In a preferred embodiment, the upper and lower base layers 16 and 18 are made of short and/or medium length fibers (e.g., fiberglass, carbon fiber, basalt fiber, quartz or partially oxidized polyactrynitrile (PAN)) and a matrix comprised of a thermoplastic resin and possibly a binder resin. The reinforcement layers or doublers are preferably dry glass or glass fabric and a compatible thermoplastic resin. However, any type of fibers are fabric can be used in the reinforcement layers (e.g., fiberglass, carbon fiber, basalt fiber, quartz or partially oxidized polyactrynitrile (PAN)). The material of the reinforcement layers 12 can be the same or different than the material of the base layers, as long as they comprise a thermoplastic. In a preferred embodiment, the material of the reinforcement layers 12 is the same as the material of the base layers. In another embodiment, the reinforcement layers are made of a material that is stronger than the base layers. For example, in an embodiment, the base layers include fiberglass therein and the reinforcement layers include carbon fibers therein. During the forming operation, as the thermoform panel assembly 10 is brought to a plastic state it is shuttled in a forming machine and the thermoplastic film or resin of the reinforcement layers 12 with the woven material achieve a plastic state at approximately the same time the upper and lower base layers 16 and 18 do, and the material of the reinforcement layers 12 co-molds/knits or welds with the surrounding material.

FIGS. 1 and 2 show exemplary outer reinforcement layers 20 and inner reinforcement layers 22. outer reinforcement layers 20 are sandwiched between the upper and lower base layers 16 and 18 and extend around the perimeter of the panel assembly 10. This provides reinforcement for areas where the panel will be attached to the frame of the aircraft. inner reinforcement layers 22 are sandwiched between the upper and lower base layers 16 and 18 and are positioned such that a window can be connected there in or thereto. It will be appreciated by those of ordinary skill in the art that these are only examples and the reinforcement layers 12 can be positioned as desired in order to provide reinforcement as desired. The reinforcement layers 12 allow targeted or desired areas of the panel assembly 10 to be strengthened or reinforced. It will be appreciated that these areas are only a portion of the surface area of the entire panel assembly 10.

An exemplary process of making the panel assembly 10 shown in FIGS. 1 and 2 will now be described. First, a number of upper and lower base layers 16 and 18 that are comprised of a thermoplastic resin with fibers therein are provided. At least one and preferably a number of reinforcement layers 12 comprised of the same or a similar material to the upper and lower base layers are provided. The reinforcement layers 12 are sandwiched between the upper and lower base layers 16 and 18. These layers are then pressed together in a thermoforming press into a sheet. In the thermoforming press, the layers are heated to a plastic state, above their glass transition temperature, (e.g., above) 700° to form the sheet. In a preferred embodiment, the temperature range is between about 450° F. and about 800° F. and in a more preferred embodiment the temperature range is between about 600° F. and about 750° F. The sheet is then transferred to the mold or tool, which is heated to a lower temperature than the press (e.g., 250° to 350°) so that when the tool clamps down or applies pressure to the sheet, the sheet is cooled and molded to the desired shape.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further any specific numbers noted herein are only examples: alternative implementations may employ differing values or ranges.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method of making a panel assembly, the method comprising the steps of:
 a. providing at least a first upper base layer having an upper surface with an upper surface area and a lower surface with a lower surface area, and wherein the first upper base layer is comprised of a thermoplastic material and includes fibers therein, b. providing at least a first lower base layer having an upper surface with an upper surface area and a lower surface with a lower surface area, wherein the upper and lower surface areas of the first upper base layer and the first lower base layer are approximately the same, and wherein the first lower base layer is comprised of a thermoplastic material and includes fibers therein, c. providing a first outer reinforcement layer having an upper surface with an upper surface area and a lower surface with a lower surface area, wherein the upper surface area of the outer reinforcement layer is smaller than the upper surface areas of the first upper and first lower base layers, wherein the first outer reinforcement layer includes an outer edge that is flush with the outer edges of the upper and lower base layers, wherein the first outer reinforcement layer includes an inner edge that defines a first outer reinforcement layer interior, and wherein the first outer reinforcement layer is comprised of a thermoplastic material and includes fibers therein, d. providing a first inner reinforcement layer having an outer edge and an inner edge, wherein the inner edge defines a first inner reinforcement layer interior, and wherein the first inner reinforcement layer is comprised of a thermoplastic material and includes fibers therein, e. positioning the first outer reinforcement layer between the first upper base layer and the first lower base layer, f. positioning the first inner reinforcement layer within the first outer reinforcement layer interior and between the first upper base layer and the first lower base layer, g. heating the first outer reinforcement layer, first inner reinforcement layer, first upper base layer and first lower base layer to a temperature above the glass transition temperature of the thermoplastic materials of the first outer reinforcement layer, first inner reinforcement layer, first upper base layer and first lower base layer to form a sheet, and h. molding the sheet to form the panel assembly.

2. The method of claim 1 wherein the fibers of the first upper base layer are comprised of the same material as the fibers of the first lower base layer, and wherein the fibers of the first outer reinforcement layer and the first inner reinforcement layer are comprised of a different material as the fibers of the first upper and first lower base layers.

3. The method of claim 2 wherein the fibers of the first upper and first lower base layers are comprised of fiberglass, and wherein the fibers of the first outer reinforcement layer and first inner reinforcement layer are comprised of carbon.

4. The method of claim 1 wherein the fibers of the first upper base layer, the fibers of the first lower base layer, and the fibers of the first outer reinforcement layer and first inner reinforcement layer are comprised of the same material.

5. The method of claim 1 further comprising the steps of:
providing a second upper base layer having an upper surface with an upper surface area and a lower surface with a lower area, and wherein the second upper base layer is comprised of a thermoplastic material and includes fibers therein, providing a second lower base layer having an upper surface with an upper surface area and a lower surface with a lower surface area, wherein the upper and lower surface areas of the second upper base layer and the second lower base layer are approximately the same, and wherein the second lower base layer is comprised of a thermoplastic material and includes fibers therein.

6. The method of claim 5 further comprising providing a second outer reinforcement layer having an upper surface with an upper surface area and a lower surface with a lower surface area, wherein the upper surface area of the second reinforcement layer is smaller than the upper surface areas of the first upper, first lower, second upper and second lower base layers, wherein the second outer reinforcement layer includes an outer edge that is flush with the outer edges of the upper and lower base layers and the first outer reinforcement layer, wherein the second outer reinforcement layer includes an inner edge that defines a second outer reinforcement layer interior, and wherein the second outer reinforcement layer is comprised of a thermoplastic material and includes fibers therein, positioning the second outer reinforcement layer between the first outer reinforcement layer and one of the first upper base layer or the first lower base layer.

7. The method of claim 6 further comprising providing a second inner reinforcement layer having an outer edge and an inner edge, wherein the inner edge defines a second inner reinforcement layer interior, and wherein the second inner reinforcement layer is comprised of a thermoplastic material and includes fibers therein, positioning the second inner reinforcement layer within the second outer reinforcement layer interior.

8. The method of claim 7 wherein the fibers of the first upper and first lower base layers are comprised of fiberglass, and wherein the fibers of the first outer reinforcement layer, second outer reinforcement layer, first inner reinforcement layer and second inner reinforcement layer are comprised of carbon.

9. The method of claim 1 further comprising the step of attaching the panel assembly to the frame of an aircraft via the first outer reinforcement layer.

10. The method of claim 1 further comprising the step of attaching a window to the first inner reinforcement layer.

* * * * *